United States Patent [19]

Griswold et al.

[11] 4,364,408

[45] Dec. 21, 1982

[54] BACKFLOW PREVENTION APPARATUS

[75] Inventors: David E. Griswold, Corona Del Mar; Richard E. Veit, Arcadia, both of Calif.

[73] Assignee: Griswold Controls, Irvine, Calif.

[21] Appl. No.: 183,584

[22] Filed: Sep. 2, 1980

Related U.S. Application Data

[62] Division of Ser. No. 10,934, Feb. 9, 1979, Pat. No. 4,244,392, which is a division of Ser. No. 410,173, Oct. 26, 1973, abandoned.

[51] Int. Cl.³ .............................................. E03C 1/10
[52] U.S. Cl. ................................. 137/107; 137/218; 251/282
[58] Field of Search ................. 137/107, 218; 251/282

[56] References Cited

U.S. PATENT DOCUMENTS

| | | | |
|---|---|---|---|
| 2,503,424 | 4/1950 | Snyder | 137/218 X |
| 3,283,772 | 11/1966 | Ensign | 137/107 |
| 3,448,763 | 6/1969 | Curtiss | 251/282 X |
| 3,724,487 | 4/1973 | Hunter | 137/218 |
| 3,837,358 | 9/1974 | Zieg et al. | 137/218 X |

Primary Examiner—Gerald A. Michalsky
Attorney, Agent, or Firm—Lyon & Lyon

[57] ABSTRACT

Two identical check valve assemblies are connected in series with a zone between them. A differential control valve vents this zone to atmosphere whenever the downstream pressure approaches the upstream pressure within a predetermined magnitude. The action of the differential control valve is responsive to differential pressure across the upstream check valve.

5 Claims, 6 Drawing Figures

BACKFLOW PREVENTION APPARATUS

This application is a Division of Ser. No. 10,934 filed Feb. 9, 1979 and entitled "Backflow Prevention Apparatus", now U.S. Pat. No. 4,244,392, which was a Division of application Ser. No. 410,173 filed Oct. 26, 1973 and entitled "Backflow Prevention Apparatus", now abandoned.

This invention relates to fluid flow apparatus and is particularly directed to improvements in construction and backflow prevention apparatus.

Check valves are commonly provided when it is desired to permit fluid flow in one direction but to prevent fluid flow in the other direction. A single check valve acting alone may leak slightly and, therefore, single check valves are not used when it is necessary to prevent any reverse flow, even in the smallest degree. In the latter situation, backflow prevention apparatus may take the form of two check valves connected in series with a "zone" between them. Both check valves remain open during normal flow in a forward direction, but in the event that the downstream pressure should approach the upstream pressure within a predetermined amount, for example, two pounds per square inch, the volume of the zone between the check valves is vented to atmosphere. In such devices, downstream pressure can never exceed upstream pressure, even under vacuum conditions with the result that reverse flow is not possible.

Backflow prevention devices of the type just described have at least two serious shortcomings. The first is that, in order to have a check valve which will close satisfactorily, and more significantly, in certain cases, maintain a predetermined minimum pressure, a spring force is used, and this must be overcome during normal flow in the forward direction. Unfortunately, this often results in a pressure drop of serious proportions, particularly when two check valves in series are employed. Another difficulty is that conventional apparatus for venting the zone between the check valves is usually costly, inaccurate and difficult to maintain.

An important object of the invention is to combine a pair of series-connected check valves with a novel form of differential control valve for venting the zone between the check valves to atmosphere when the downstream pressure approaches the upstream pressure within a predetermined amount.

Other and more detailed objects and advantages will appear hereinafter.

Figure 3:
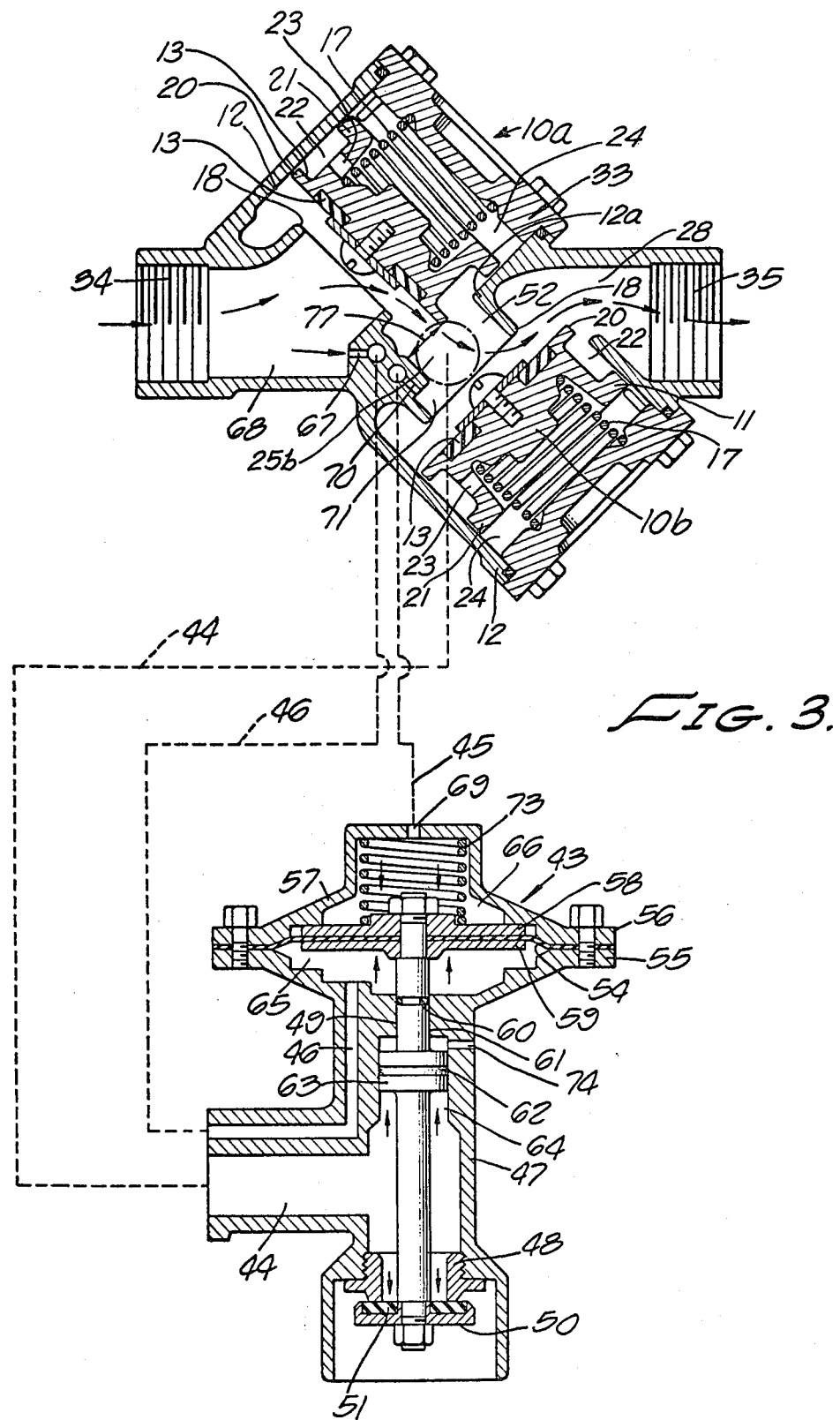
FIG. 3 is a schematic diagram in sectional elevation showing a double check valve assembly and its connections to a differential control valve assembly, the parts being shown in position for full flow in the normal direction.

Referring to the drawings, the double check valve assembly generally designated 33 and shown in FIG. 3 employs two duplicate check valve assemblies 10a and 10b. Each is provided with a stationary cylindrical barrel 12 having a concentric valve seat 18. A valve poppet 11 is mounted for axial sliding movement within the stationary barrel 12 and carries a sealing element 13 for contact with the seat 18. A coil compression spring 17 acts to move the valve poppet 11 toward closed position. When both check valves 10a and 10b are open, flow occurs in the direction of the arrows from the inlet terminal 34 through the zone 52 between the check valves and through the outlet terminal 35.

Each check valve has a first flange 20 with a first annular surface 25 co-planar with the sealing surface of the seal ring 13 and extending radially outward therefrom. The flange 20 also has a second surface 25a on the other side of the flange which forms one side of groove 22. The wall portion 12a of the inclined barrel 12 extends into the discharge passage 28 so that when flow takes place the discharge pressure is not reflected into the spring chamber 24.

Flange 21 effectively serves as a separator between the localized region 25b of relatively rapid flow and consequent reduced pressure, and the discharge pressure in the outlet passage 28. A portion of the flange 20 protrudes into the region 25b, creating a restriction 77. The pressure is thus lowered in groove 22 and this reduced pressure is reflected through communicating port 23 to the chamber 24.

Figure 1:
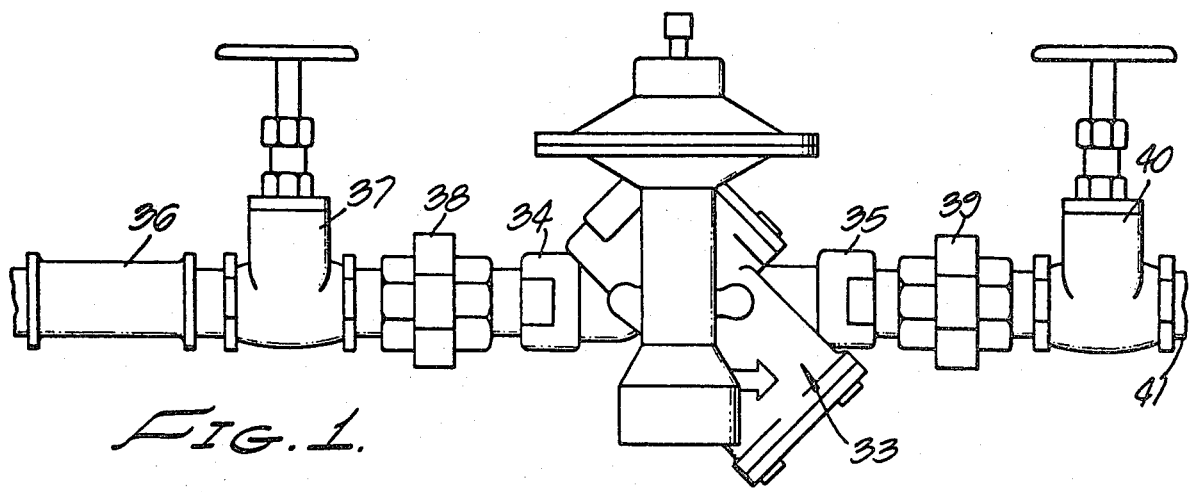
FIG. 1 is a side elevation showing a complete backflow preventer assembly embodying this invention.
Figure 2:
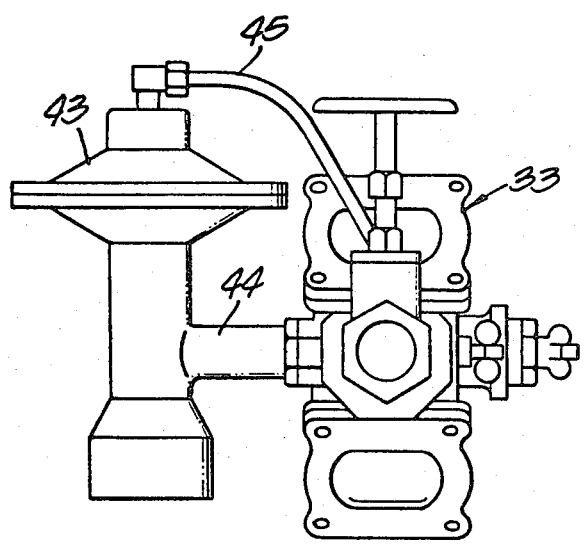
FIG. 2 is an end elevation of the device shown in FIG. 1.

The backflow preventer assembly shown in FIGS. 1, 2 and 3 includes a double check valve assembly 33 having its inlet passage 34 connected to a supply pipe 36 through a shutoff valve 37 and a union coupling 38. The outlet passage 35 of the double check valve assembly 33 is connected through union coupling 39 and shutoff valve 40 to the service pipe 41. The passages 34 and 35 have a common axis and the barrels 12 are each inclined with respect thereto. The barrels 12 and the motion of their respective valve poppets 11 are at right angles to each other. The discharge from the first check valve 10a through passage 71 is directly against the valve poppet 11 of the second check valve.

A control valve assembly 43 is connected to the double check valve assembly 33 by means of discharge pipe 44 and pressure-sensing lines 45 and 46. The discharge pipe 44 forms a portion of the stationary housing 47 which contains a removable valve seat 48. A valve stem 49 carries a valve head 50 at its lower end and a resilient disk 51 on the valve head closes against the seat 48. When the parts are in position as shown in FIG. 3, the valve is closed and therefore discharge of fluid from the port 52 in the double check valve assembly 33 through discharge pipe 44 is prevented. The port 52 is located downstream from the check valve 10a and upstream from the check valve 10b.

Means are provided for moving the stem 49 to open or close the valve 48, 50, and as shown in the drawings this means includes flexible diaphragm 54 having its outer periphery clamped between the flange 55 on the housing 47 and the flange 56 on the cover 57. The inner portion of the diaphragm 54 is clamped to the stem 49 between the plates 58 and 59. A seal ring 60 on the stem 49 slides within the housing bore 61, and a seal ring 62 on the annular piston 63 of the stem 49 slides within the housing bore 64.

A chamber 65 is formed within the housing 47 below the diaphragm 54 and a chamber 66 is formed above the diaphragm within the cover 57. The chamber 65 communicates through passage 46 and port 67 with the inlet passage 68 of the check valve assembly 10a. The chamber 66 is connected through cover port 69, passage 45 and port 70 with the inlet passage 71 for the check valve assembly 10b. From this description it will be understood that the differential pressure across the diaphragm 54 is the same as the differential pressure between the inlet passage 68 and the inlet passage 71.

The coil compression spring 73 in the chamber 66 acts on the diaphragm plate 58 to move the stem 49 in a direction to open the discharge valve 48, 50. The force of the spring is assisted by the unit pressure in the chamber 66 and is opposed by the unit pressure in the chamber 65. This opposition force is increased by the fluid pressure acting against the underside of the annular piston 63. The annular space above the piston 63 and within the housing 47 is vented to atmosphere through vent port 74.

In operation, the differential control valve 43 serves to vent the zone between the check valve assemblies 10a and 10b through the discharge port 52 whenever the downstream pressure approaches the upstream pressure within a predetermined amount. Thus, for example, the parts may be designed and adjusted so that when the pressure in the inlet terminal 34 is less than two PSI greater than the pressure in the outlet terminal 35, the differential control valve 43 will open to permit fluid to flow from the zone port 52 through the pipe 44 and through the open valve 48, 50 to atmosphere. The several forces applied to the stem 49 in addition to gravity are the opposing forces developed by inlet pressure reflected in chamber 65, outlet pressure reflected in chamber 66, zone pressure at port 52 reflected against piston 63, as well as on discharge valve 50, and the force of spring 73.

It will be observed that the effective area of the diaphragm 54 is much greater than that of the valve seat 48. Also, the ports 67 and 70 are angularly positioned to reflect both static and dynamic pressures in their respective passages. Accordingly, the differential control valve 43 causes fluid to be vented out through zone port 52 whenever the outlet passage pressure from check valve assembly 10a (reflected through line 34) plus the force of the spring 76, plus the effect of gravity, exceeds the inlet pressure from passage 68 (reflected through line 46) acting in chamber 65. The balance piston 63 has the same effective area as that of the seat 48, plus that of the communicating stem 49, so that the pressure exerted on the valve head 50 and the sliding stem 49 is balanced out by the pressure exerted on the piston 63. In similar fashion, the differential control valve 43 remains closed to prevent loss of fluid through the zone port 52 so long as the total force generated by inlet pressure in the chamber 65 exceeds the sum of the force generated by outlet pressure in chamber 66 supplemented by the force of the spring 73 and by the effect of gravity.

Figure 6:
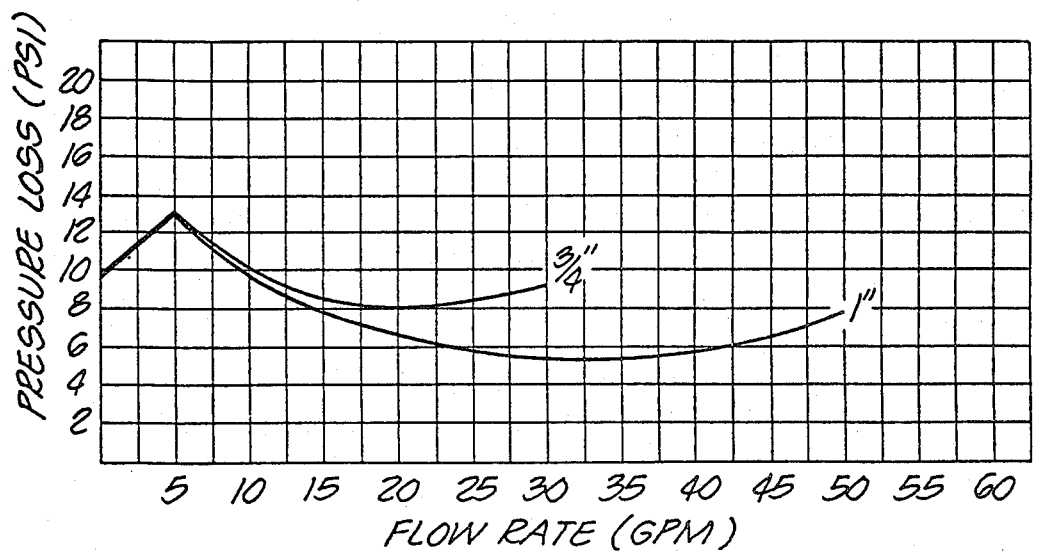
FIG. 6 is a graph showing pressure loss plotted against flow rate for the backflow preventer device shown in FIGS. 1, 2 and 3. One curve of the graph relates to a device of three-quarter inch nominal size, and the other curve relates to the one-inch nominal size.

The chart of FIG. 6 shows the pressure loss through the backflow preventer assembly shown in FIGS. 1, 2 and 3, for both the nominal size of three-quarter inch and the nominal size of one inch, when normal flow occurs in the forward direction. It will be observed that the pressure loss through the entire backflow preventer assembly actually falls off as the flow rate increases up to about 20 gallons per minute for the three-quarter inch size, and up to about 32 gallons per minute for the one inch size.

Figure 4:
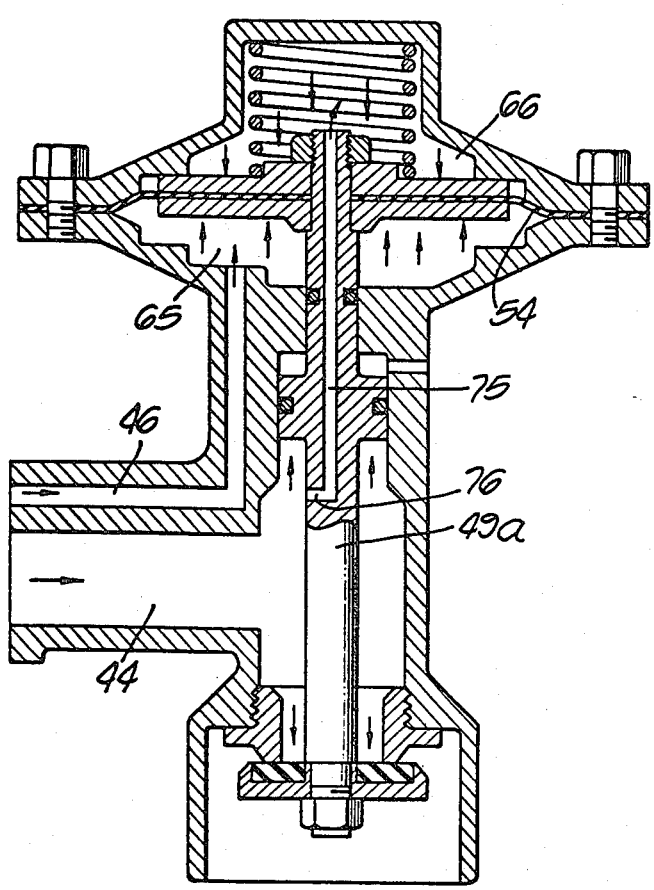
FIG. 4 is a sectional view showing a modified form of differential pressure control valve, the parts being positioned for normal forward flow.
Figure 5:
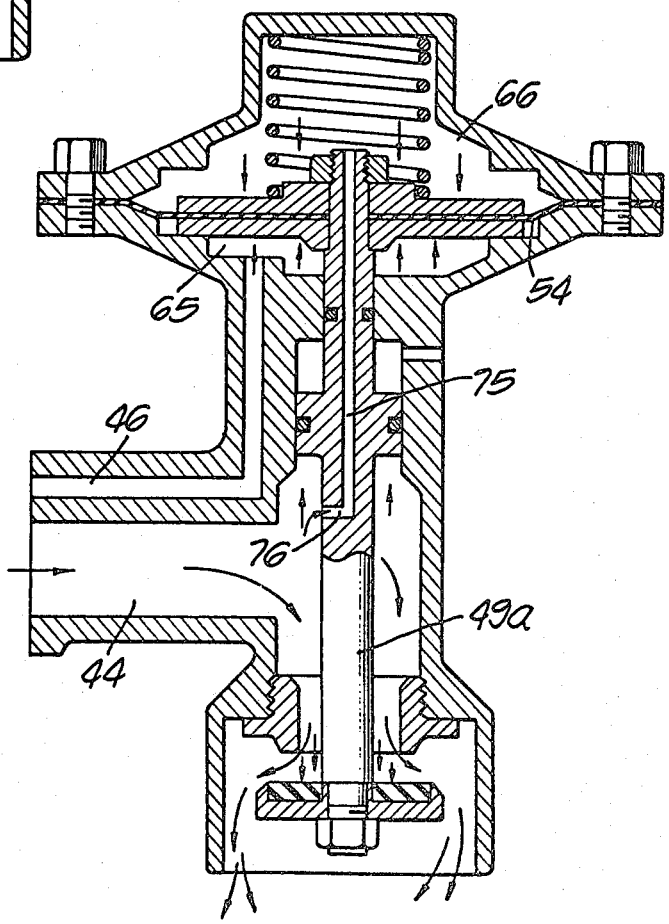
FIG. 5 is a view similar to FIG. 4, the parts in position corresponding to backflow conditions.

In the modified form of differential control valve shown in FIGS. 4 and 5, an axial passage 75 in the stem 48a replaces the cover port 69. This passage 75 and its side outlet port 76 establishes communication between the cover chamber 66 and the discharge pipe 44. Only one sensing line 46 is used, and it connects the chamber 65 through line 46 to the inlet passage 68, as described above. The sensing line 45 and port 70 are not used. FIG. 4 shows the parts of the diaphragm control valve in closed position corresponding to normal forward flow operation, and FIG. 5 shows the same parts in position to discharge fluid from the zone port 52 to atmosphere when backflow conditions are present or imminent. In other respects, the construction and operation of the modified form of the diaphragm control valve shown in FIGS. 4 and 5 are the same as that previously described.

Having fully described our invention, it is to be understood that we are not to be limited by the details herein set forth but that our invention is of the full scope of the appended claims.

I claim:

1. For use with two check valve assemblies connected in series and defining a zone between them, a differential control valve having a housing provided with a valve seat, a stem mounted to move axially in the housing and having a valve head movable to close against said seat, a cover, a flexible diaphragm having its periphery clamped between the cover and the housing and acting to define a chamber in the housing and a chamber in the cover, means connecting the central portion of the diaphragm to the stem, a spring in the cover chamber acting to move the stem in a direction to open the valve, a discharge port in the zone connected to said housing, a pressure sensing line connecting the housing chamber to the upstream side of the upstream check valve assembly, means connecting the cover chamber to reflect the pressure in said zone, and a balance piston fixed on the stem slidably mounted within the housing to balance the fluid pressure force from the zone tending to move the valve head away from the valve seat.

2. For use with two check valve assemblies connected in series and defining a zone between them, a differential control valve having a housing provided with a valve seat, a stem mounted to move axially in the housing and having a valve head movable to close against said seat, a cover, a flexible diaphragm having its periphery clamped between the cover and the housing and acting to define a chamber in the housing and a chamber in the cover, means connecting the central portion of the diaphragm to the stem, a spring in the cover chamber acting to move the stem in a direction to open the valve, a discharge port in the zone connected to said housing, a pressure sensing line connecting the housing chamber to the upstream side of the upstream check valve assembly, a pressure sensing passage in the stem connecting the cover chamber to the interior of the housing, and a balance piston fixed on the stem slidably mounted within the housing to balance the fluid pressure force from the zone tending to move the valve head away from the valve seat.

3. For use with two check valve assemblies connected in series and defining a zone between them, a differential control valve having a housing provided with a valve seat, a stem mounted to move axially in the housing and having a valve head movable to close against said seat, a cover, a flexible diaphragm having its periphery clamped between the cover and the housing and acting to define a first chamber in the housing and a second chamber in the cover, means connecting the central portion of the diaphragm to the stem, a spring in one of said chambers acting to move the stem in a direction to open the valve, a discharge port in the zone connected to said housing, a pressure sensing line connecting the other of said chambers to the upstream side of the upstream check valve assembly, and a pressure sensing line connecting the chamber having the spring to the downstream side of said check valve assembly, and a balance piston fixed on the stem slidably mounted within the housing to balance the fluid pressure force from the zone port tending to move the valve head away from the valve seat.

4. The combination set forth in claim 3 in which said pressure sensing lines each have a port sensitive to both static and dynamic heads, with the upstream sensing port subjected to a substantially greater total head than the downstream sensing port.

5. For use with two check valve assemblies connected in series and defining a zone between them, a differential control valve having a housing provided with a valve seat, a stem mounted to move axially in the housing and having a valve head movable to close against said seat, a cover, a flexible diaphragm having its periphery clamped between the cover and the housing and acting to define a first chamber in the housing and a second chamber in the cover, means connecting the central portion of the diaphragm to the stem, a spring in one of said chambers acting to move the stem in a direction to open the valve, a discharge port in the zone connected to said housing, a pressure sensing line connecting the other of said chambers to the upstream side of the upstream check valve assembly, and a pressure sensing passage in the stem connecting the chamber having the spring to the interior of the housing, and a balance piston fixed on the stem slidably mounted within the housing to balance the fluid pressure force from the zone port tending to move the valve head away from the valve seat.

* * * * *